(12) United States Patent
Lin

(10) Patent No.: US 9,405,053 B2
(45) Date of Patent: Aug. 2, 2016

(54) LED MODULE

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 87 days.

(21) Appl. No.: 14/526,156

(22) Filed: Oct. 28, 2014

(65) Prior Publication Data

US 2016/0070050 A1   Mar. 10, 2016

(30) Foreign Application Priority Data

Sep. 9, 2014   (TW) .............................. 103130969 A

(51) Int. Cl.
| | |
|---|---|
| *F21V 7/04* | (2006.01) |
| *F21V 8/00* | (2006.01) |
| *F21V 29/76* | (2015.01) |
| *F21K 99/00* | (2016.01) |

(52) U.S. Cl.
CPC ................ *G02B 6/0028* (2013.01); *F21K 9/52* (2013.01); *F21V 29/763* (2015.01); *G02B 6/0073* (2013.01); *G02B 6/0085* (2013.01)

(58) Field of Classification Search
CPC .. G02B 6/0028; G02B 6/0085; F21V 29/763; F21K 9/52
USPC .................................................. 362/610, 552
See application file for complete search history.

(56) References Cited

U.S. PATENT DOCUMENTS

| | | | |
|---|---|---|---|
| 6,290,382 B1 * | 9/2001 | Bourn ................ | G01N 21/8806 362/294 |
| 6,505,955 B1 * | 1/2003 | Hatjasalo ................. | B60Q 1/32 264/171.13 |
| 7,959,338 B2 * | 6/2011 | Kazakevich ......... | A61B 1/0607 362/554 |

* cited by examiner

*Primary Examiner* — Ali Alavi
(74) *Attorney, Agent, or Firm* — ScienBiziP, P.C.

(57) ABSTRACT

An LED module, includes a heat sink, an LEDs mounted on a side of the heat sink and a light guide plate spaced from the LED light source. A flexible light guiding tube is disposed between the light guide plate and the LED light source. The flexible light guiding tube has an first end. A bore diameter of the outmost end of the first end is larger than or equal to a diameter of a top end of the LED light source. The outmost end covers the top end of the LEDs therein. Compared to the prior art, The LED module of the present disclosure has high luminous efficiency and good thermal performance.

6 Claims, 3 Drawing Sheets

LED MODULE

CROSS-REFERENCE TO RELATED APPLICATIONS

This application claims priority to Taiwanese Patent Application No. 103130969 filed on Sep. 9, 2014, the contents of which are incorporated by reference herein.

FIELD

The disclosure relates to a light emitting diode (LED) module.

BACKGROUND

The LED module usually is used for a light source of a vehicle lamp and includes a guide plate and a plurality of LEDs mounted on one end of the guide plate. Some lights emitted from the LEDs is prone to escape from the guide plate and radiates random.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

A definition that applies throughout this disclosure will now be presented. The term "comprising" means "including, but not necessarily limited to"; it specifically indicates open-ended inclusion or membership in a so-described combination, group, series and the like.

Figure 1:
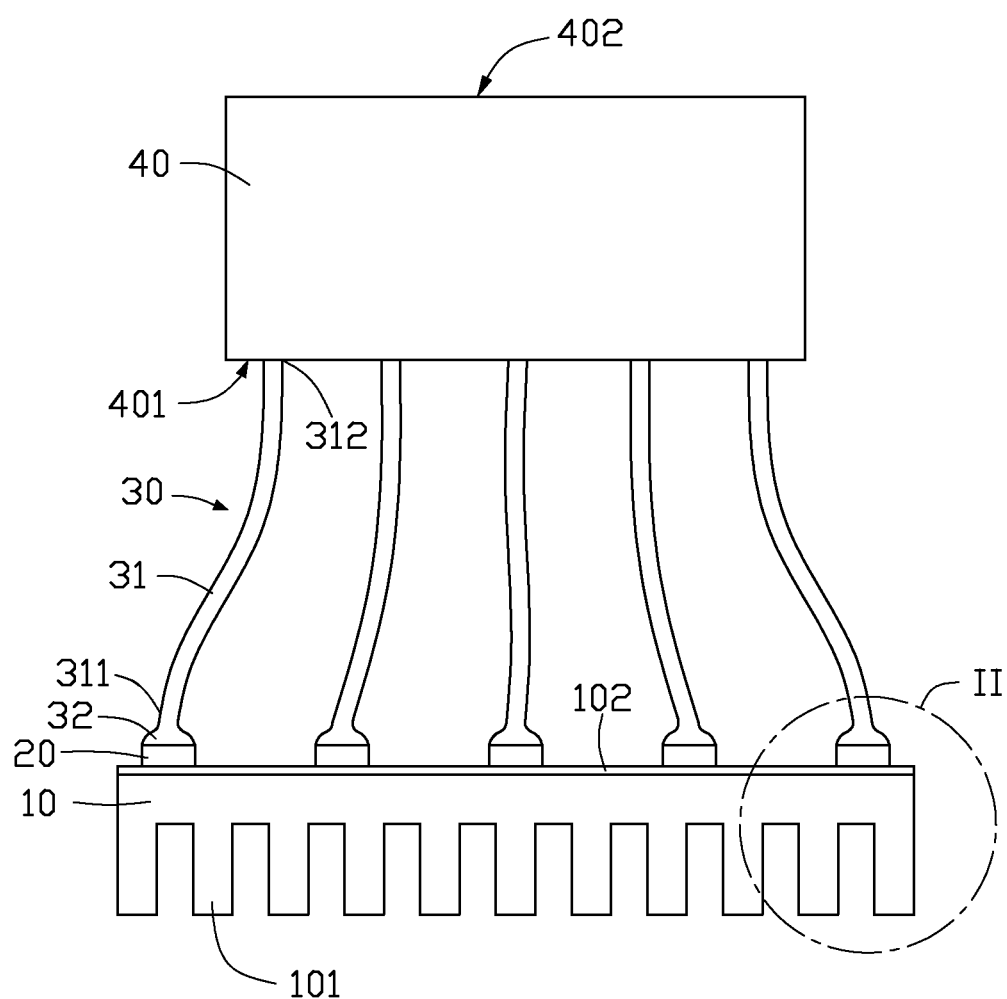
FIG. 1 is a diagrammatic view of an LED module of the present disclosure.

Referring to FIG. 1, the LED module includes a heat sink 10, a plurality of LEDs 20 mounted on one side of the heat sink 10, a guide plate 40 and a plurality of flexible light guiding tubes 30 disposed between the LEDs 20 and the guide plate 40.

Figure 2:
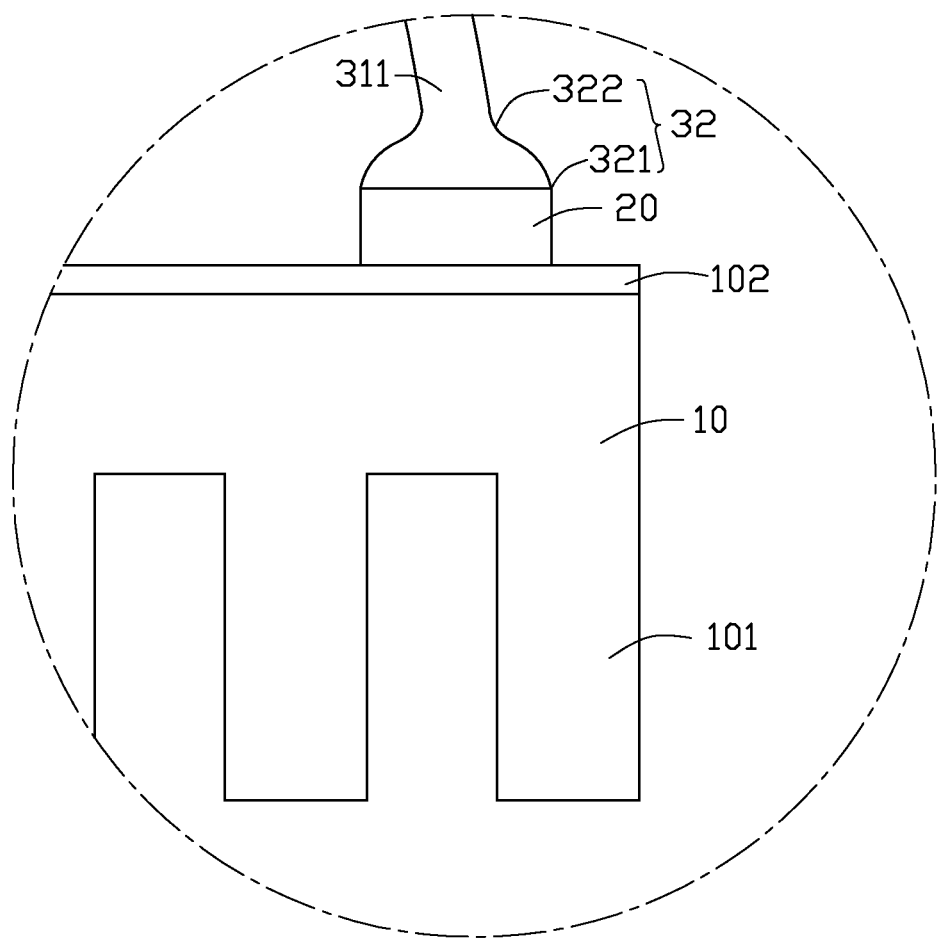
FIG. 2 is a diagrammatic view of the circle II of the LED module of FIG. 1.

Referring to FIG. 2, the heat sink 10 is made of a material having good heat dissipation efficiency. The heat sink 10 includes a substrate 102 and a plurality of fins 101 extending from a bottom surface of the substrate 102. The fins 101 are separated from each other to dissipate heat absorbed from the substrate 102. The substrate 102 has a first side 103, the plurality of LEDs mounts on the first side 103 of the substrate 102 of the heat sink 10.

Heat generated from the LEDs 20 is absorbed by the heat sink 10. Each of the plurality of LEDs 20 is substantially cylindrical with a diode diameter and a substantially circular top surface facing away from the heat sink 10.

Figure 3:
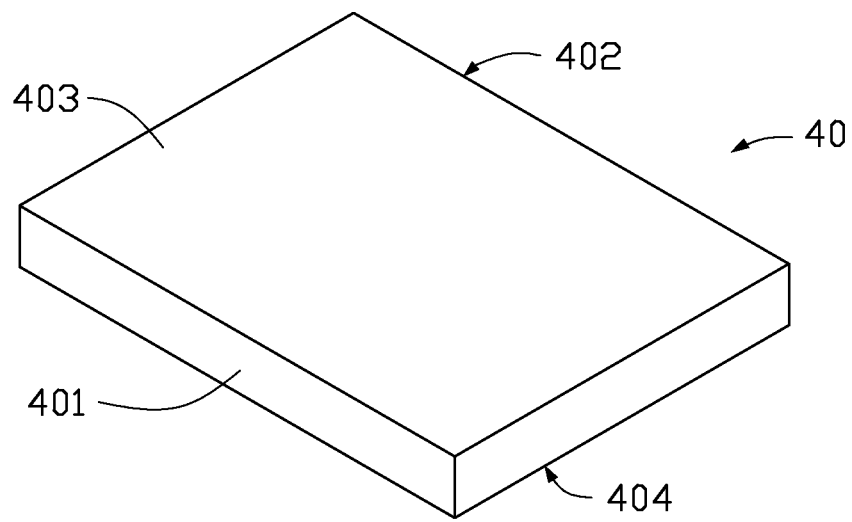
FIG. 3 is an isometric view of the guide plate of the LED module of FIG. 1.

Referring to FIG. 3, the guide plate 40 is located above the LEDs 20, and is made of high reflectivity materials. The guide plate 40 positioned away from the heat sink 10 and substantially facing the substrate 102. The guide plate 40 is a flat plate and includes a first incident surface 401 and a second incident surface 402 located at opposite sides thereof, a back surface 403 and an exiting surface 404 located at opposite ends thereof. Light of the LEDs 20 enters the guide plate 40 through the first incident surface 401 and the second incident surface 402, is reflected by the back surface 403 and radiates from the exiting surface 404. Many light guide points may be set in the guide plate 40 to improve the light uniformity of the exiting surface 404.

The plurality of flexible light guiding tubes 30 are set between the LEDs 20 and the guide plate 40 to couple the light from the LEDs 20 to enter the guide plate 40. The flexible light guiding tube 30 is made of high reflectivity and flexible materials. Each flexible light guiding tube 30 is tubular and has an end portion 32 with a first end 321 and a second end 322 opposite the first end 321, and a body portion 31, the body portion 31 has a first end 311 connected to the second end 322 of the end portion 32 and a second end 312 opposite the first end 311. The first end 321 connects with the LEDs 20. The second end 312 connects with the first incident surface 401 of the guide plate 40. The first end 321 has a bugle-like shape. The diameter of the end portion 32 increases from the second end 322 to the first end 321 of the end portion 32. The bore diameter of the outmost end of the first end 321 is larger than or equal to a diameter of a top end of the LEDs 20 to cover the top end of the LEDs 20 therein. The diameter of the first end 311 of the body portion 31 of each of the plurality of flexible light guiding tubes 30 is substantially equal to the diameter of second end 322 of the end portion 32. The light from the LEDs 20 couple into the flexible light guiding tubes 30 by the first end 321 and then enter the guide plate 40 by the second end 312 and the first incident surface 401. The plurality of light guiding tubes 30 are disposed between the plurality of LEDs 20 and the guide plate 40 with the first end 321 of the end portion 32 of each of the plurality of guiding tubes 30 covering the top surface of one of the plurality of LEDs 20 and the second end 312 of each of the plurality light guiding tubes coupled to the guide plate 40.

It can understand that the second incident surface 402 may also mount the LEDs 20 and the flexible light guiding tube 30.

The LEDs 20 of the present disclosure has set the flexible light guiding tube 30 that may bond and extend corresponding to the LEDs 20. So an area of the LEDs 20 is not limited because of the thickness of the guide plate 40. The LEDs 20 also can use flat LEDs of high power, and the spacing between every LEDs 20 is not limited. The LED module of the present disclosure has high luminous efficiency and good heat dissipating performance.

It is to be further understood that even though numerous characteristics and advantages have been set forth in the foregoing description of embodiments, together with details of the structures and functions of the embodiments, the disclosure is illustrative only; and that changes may be made in the details, including in matters of shape, size, and arrangement of parts within the principles of the disclosure to the full extent indicated by the broad general meaning of the terms in which the appended claims are expressed.

The embodiments shown and described above are only examples. Many details are often found in the art such as the other features of an LED package. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A LED module comprising:
   a heat sink having a first side;
   a plurality of light emitting diodes mounted on the first side of the heat sink, each of the plurality of light emitting diodes being substantially cylindrical with a diode diameter and a substantially circular top surface facing away from the heat sink;
   a guide plate positioned away from the heat sink and substantially facing the first side of the heat sink; and
   a plurality of flexible light guiding tubes, each light guiding tube having an end portion with a first end and a second end opposite the first end, and a body portion, the body portion having a first end connected to the second end of the end portion and a second end opposite the first end;
   wherein, the diameter of the first end of the body portion of each of the plurality of light guiding tubes is substantially equal to the diameter of second end of the end portion with the diameter of the end portion increasing from the second end to the first end of the end portion;
   wherein, the diameter of the first end of the end portion is equal to or greater than the diode diameter; and
   wherein, the plurality of light guiding tubes are disposed between the plurality of light emitting diodes and the guide plate with the first end of the end portion of each of the plurality of guiding tubes covering the top surface of one of the plurality of light emitting diodes and the second end of each of the plurality light guiding tubes coupled to the guide plate.

2. The LED module of claim 1, wherein the first end of the flexible light guiding tube has a bugle-like shape.

3. The LED module of claim 1, wherein the guide plate includes a first incident surface and a second incident surface, the second end of the body portion of the plurality of flexible light guiding tubes connects with the first incident surface and the second incident surface of the guide plate.

4. The LED module of claim 1, wherein each flexible light guiding tube connects with each light LED.

5. The LED module of claim 1, wherein the plurality flexible light guiding tubes is made of high reflectivity and flexible materials.

6. The LED module of claim 1, wherein the heat sink includes a substrate and a plurality of fins extending from a bottom surface of the substrate.

* * * * *